(12) United States Patent
Martin

(10) Patent No.: US 6,305,744 B1
(45) Date of Patent: Oct. 23, 2001

(54) EJECTABLE SAFETY SEAT STRUCTURE FOR RECREATIONAL-TYPE VEHICLES

(76) Inventor: Michel Martin, 1375 rue Bernier, Acton Vale Quebec (CA), J0H 1A0

( * ) Notice: Subject to any disclaimer, the term of this patent is extended or adjusted under 35 U.S.C. 154(b) by 0 days.

(21) Appl. No.: 09/417,719

(22) Filed: Oct. 13, 1999

(51) Int. Cl.[7] .................................. B62J 1/28; B62J 7/04
(52) U.S. Cl. .............................. 297/216.11; 297/195.13; 297/216.16
(58) Field of Search ........................... 297/216.1, 216.11, 297/216.16, 195.13, 195.2, 195.1; 296/68.1

(56) References Cited

U.S. PATENT DOCUMENTS

| | | | |
|---|---|---|---|
| 5,468,046 | * 11/1995 | Weber et al. ............... | 297/216.11 X |
| 5,542,587 | * 8/1996 | Broz et al. ................. | 297/195.13 X |
| 5,553,915 | * 9/1996 | Stamatakis ................. | 297/195.13 |
| 5,639,144 | * 6/1997 | Naujokas .................... | 297/216.11 X |

* cited by examiner

*Primary Examiner*—Peter R. Brown
(74) *Attorney, Agent, or Firm*—Swabey Ogilvy Renault; Guy J. Houle

(57) ABSTRACT

An ejectable safety seat structure is comprised of an outer rigid shell for securement to a vehicle. An inner protective shell is connected to the outer shell by impact force detachable elements which are removably securable to the inner shell. A harness is secured to the inner shell for detachably securing an occupant therein having a weight within the range of from about 25 pounds to 100 pounds. The impact force detachable elements automatically disconnect from the inner shell when the detachable elements are subjected to a predetermined force upon impact of the vehicle.

15 Claims, 5 Drawing Sheets

| WEIGHT GROUP | WIDTH OF STRAP (16.5 IN LONG) | RETENTION LIGHT OF VELCRO HOOKS (2 IN WIDTH) | RETENTION AREA (in²) |
|---|---|---|---|
| 1 | 1 po | 5.75 po | 2 |
| 2 | 1 po | 5 po | 2.75 |
| 3 | 1 po | 1.5 po | 6.25 |
| 4 | 2 po | 3.25 po | 9 |

| GROUP | WEIGHT MIN. (lbs) | WEIGHT MAX. (lbs) | MAX+5% | FORCE (1.2g) (+ SHELL) | FORCE (1.5g) (+ SHELL) | g (FORCE MIN.) (WHEN MAX 1.5g) |
|---|---|---|---|---|---|---|
| 1 | 25.00 | 35.36 | 37.1 | 53.0 | 66.2 | 2.1 |
| 2 | 35.36 | 50.00 | 52.5 | 71.4 | 89.3 | 2.1 |
| 3 | 50.00 | 70.71 | 74.2 | 97.5 | 121.9 | 2.1 |
| 4 | 70.71 | 100.00 | 105.0 | 134.4 | 168.0 | 2.2 |

FIG. 6

EJECTABLE SAFETY SEAT STRUCTURE FOR RECREATIONAL-TYPE VEHICLES

TECHNICAL FIELD

The present invention relates to an ejectable safety seat structure and particularly to a passenger safety seat for use on recreational vehicles such as motorcycles, snowmobiles, etc. and wherein the occupant and an inner shell of the seat is automatically disconnected and released from the vehicle when subjected to a predetermined force upon impact of the vehicle.

BACKGROUND ART

Many serious accidents take place every year when operating recreational vehicles, such as motorcycles, snowmobiles, all terrain vehicles, etc. because such vehicles do not provide any structural protection for their occupants. Accordingly, when an accident occurs, the occupant will be projected by the impact force or remain on the vehicle if strapped thereon. For this reason, often infants do not occupy such vehicles due to the risk of injury. This disadvantage somewhat restricts the use of such vehicles by the parents. In an attempt to overcome such problem, various attempts have been made to develop safety restraints for children passengers. An example of such devices is exemplified by reference to U.S. Pat. No. 4,560,097 which discloses a safety harness for securing a child passenger to the driver of a motorcycle. The safety harness is comprised of a vest which is worn by the child and which is strapped to the driver. Because the driver of such vehicles is the one that is most often subjected to the most critical injuries, then the child strapped to the driver will also be subjected to the same hazards and may additionally be injured by the weight of the driver. Accordingly, this solution is not satisfactory.

U.S. Pat. No. 4,195,879 also discloses an infant or child restraining seat for a snowmobile vehicle. However, although the seat provides lateral protection to an infant, it is rigidly secured to the snowmobile vehicle and if the vehicle is involved in a collision, the child will not free itself form the vehicle and be subjected to injury as the child is restrained by a harness which is anchored to the seat structure for holding the child firmly in the seat.

The present invention contemplates an ejectable or automatically disconnectable safety seat structure which has an inner shell which is secured to an outer shell which is attached to a vehicle and wherein the inner shell is secured by impact force detachable means which releases the inner shell automatically when the detachable means is subjected to a predetermined force upon impact of the vehicle. It is known to provide combination seats wherein a seat to which an infant is strapped can be connected and disconnected from a shell. However, these combination seats are used to facilitate the transport of the infant to and from a vehicle and the child remains strapped in the seat which is utilized as a carrier and multipurpose seat. The seat to which the child is strapped is detachably connected to a frame which is attached to a vehicle seat. The seat containing the infant is not automatically detachable therefrom but rigidly secured and may only be detached by the parent by actuating a connecting mechanism. Examples of these are described in U.S. Pat. Nos. 4,733,909, 4,750,783 and 4,915,446. These seats are not to be construed as automatically disconnectable safety seats, which is the object of the present invention.

SUMMARY OF INVENTION

It is a feature of the present invention to provide an ejectable safety seat structure wherein an inner protective shell is connected to an outer shell by impact force detachable means wherein the inner shell automatically disconnects when the attachable means is subjected to a predetermined force upon impact of a vehicle to which the outer shell is secured.

Another feature of the present invention is to provide an ejectable safety seat structure, as above described, and wherein the impact force detachable means is constituted by VELCRO connections which are easy to install and secure.

Another feature of the present invention is to provide an ejectable safety seat structure, as above described, and wherein the impact force detachable means may be adapted to different groups of occupant weights.

Another feature of the present invention is to provide an ejectable safety seat structure for use on recreational vehicles such as motorcycles, snowmobiles, all terrain vehicles, etc. and wherein the occupant and a protective shell to which the occupant is strapped, is automatically disconnected from the vehicle when the vehicle is subjected to a predetermined impact force.

Another feature of the present invention is to provide an ejectable safety seat structure and particularly for use by infants, and wherein the seat is easy to install on a vehicle and easy to adjust to receive different infant sizes.

According to the above features, from a broad aspect, the present invention provides an ejectable safety seat structure which comprises an outer rigid shell for securement to a vehicle. An inner protective shell is connected to the outer shell by impact force detachable means which is removably securable to the inner shell. A harness is secured to the inner shell for detachably securing an occupant therein. The impact force detachable means automatically disconnects from the inner shell when the detachable means is subjected to a predetermined force upon impact of the vehicle.

BRIEF DESCRIPTION OF DRAWINGS

A preferred embodiment of the present invention will now be described with reference to the accompanying drawings in which:

FIG. 4 is a fragmented perspective view showing a preferred realization of the impact force detachable means which secures the inner protective shell to the outer shell;

FIGS. 5 and 6 are Tables showing the impact force detachable VELCRO connector specification with respect to different groups of occupant sizes and test results of the ejectable safety seat with occupants within each of the size groups;

DESCRIPTION OF PREFERRED EMBODIMENTS

Figure 1:
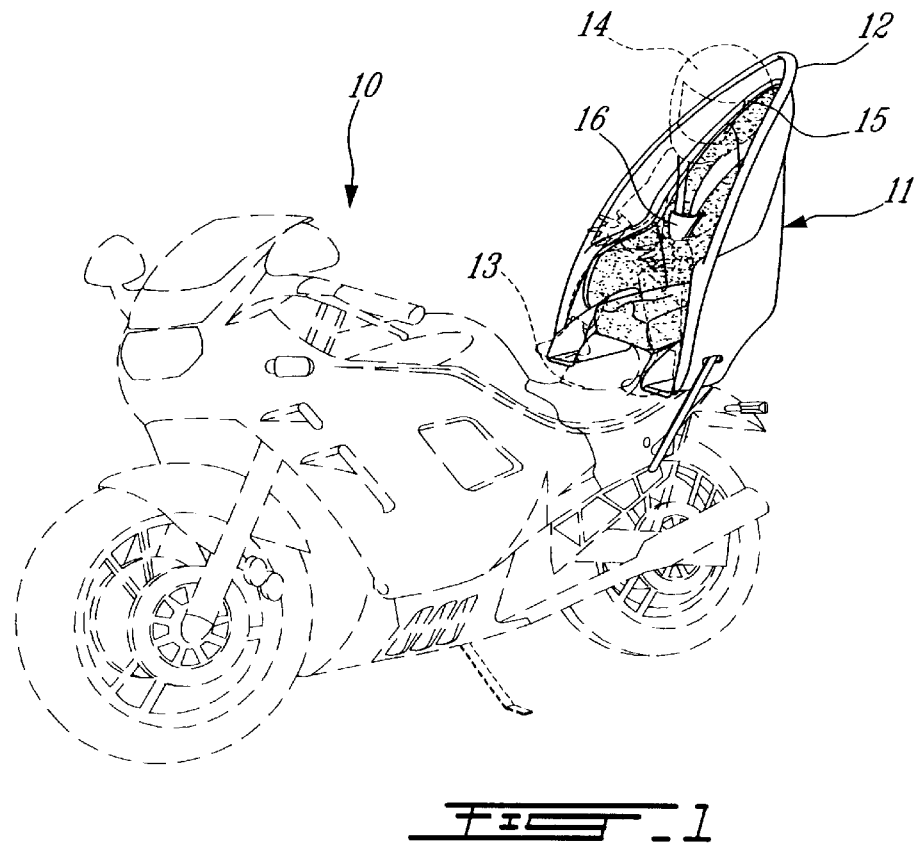
FIG 1. is a perspective view showing an ejectable safety seat constructed in accordance with the present invention and secured to a motorcycle.

Referring now to the drawings, and more particularly to FIG. 1, there is shown generally at 10 a motorcycle to which the ejectable safety seat structure 11 of the present invention is secured. As hereinshown the outer shell 12 of the safety seat structure 11 is rigidly connected to the rear portion of the seat 13 of the motorcycle 10 behind the conductor. An infant occupant 14 is strapped to an inner shell 15 by a harness 16. Upon the motorcycle being subjected to an impact, it will transmit the impact force to the ejectable safety seat structure 11 and if this force exceeds a predetermined force, it will cause the inner protective shell 15 and the infant secured therein to disconnect from the outer rigid shell which is secured to the motorcycle. Upon being disconnected, the weight of the infant and its motion created by the impact force will cause the inner shell to eject with the inner shell offering it protection.

Figure 2:
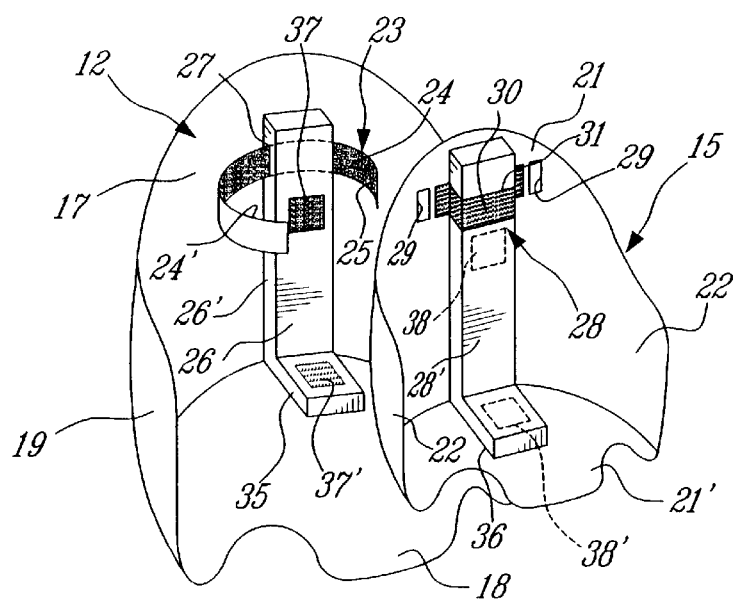
FIG 2. is an exploded view showing the basic component parts of the ejectable safety seat of the present invention.
Figure 3:
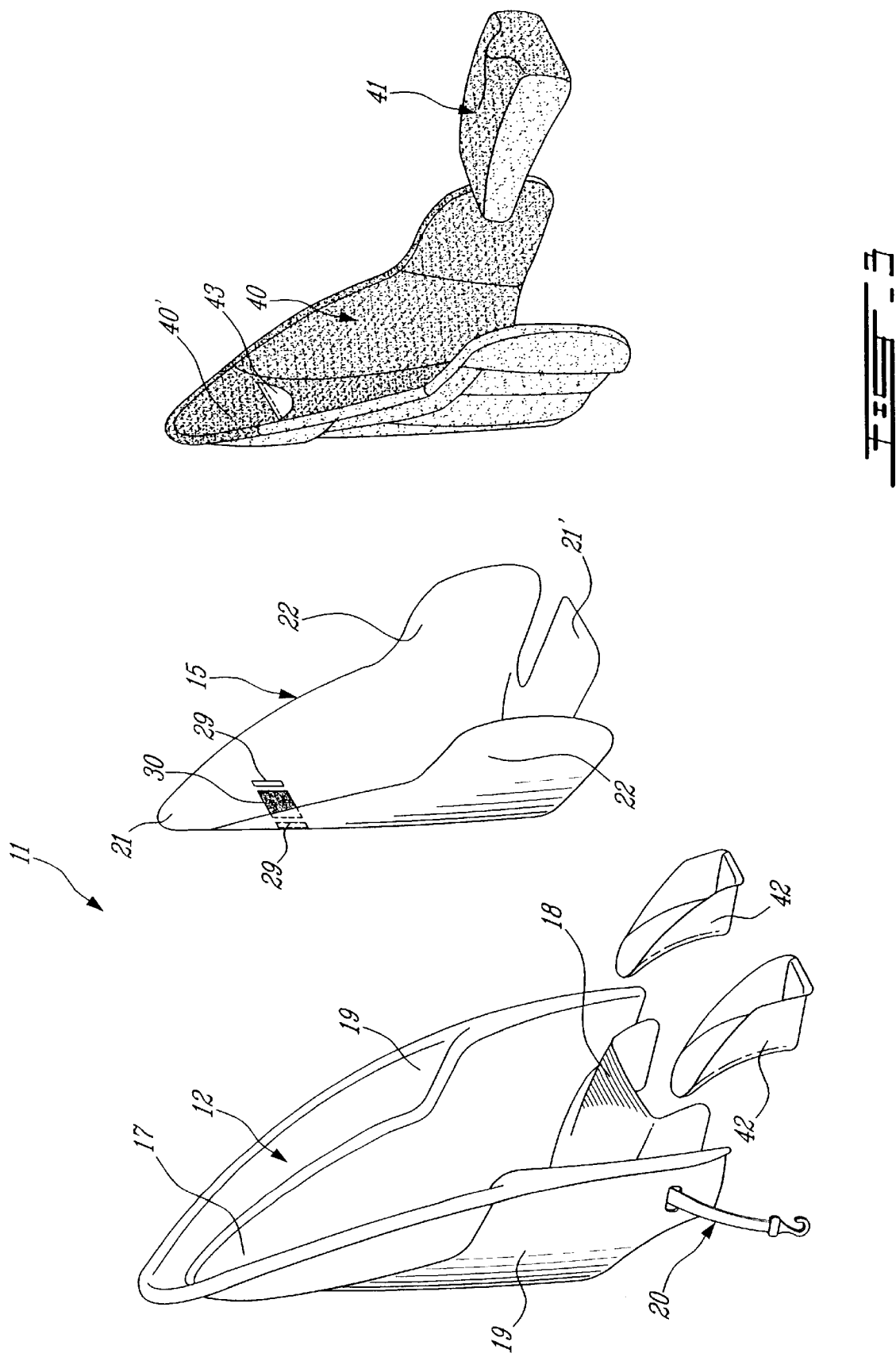
FIG. 3 is a further perspective view showing further details of the ejectable safety seat construction of the present invention.

The manner in which the inner shell is automatically released from the outer shell will now be described with reference to FIGS. 2 and 4. As shown in FIG. 2, the outer shell 12 is formed of a rigid material such as fiberglass or fiberglass with carbon fibers or thermoformed plastic or injected plastic laminate and is dimensioned to receive the inner shell 15 at a predetermined position therein. The outer shell 12 has a backrest portion 17, a seat portion 18 and side wall portions 19. The outer shell 12 is secured to a vehicle by adjustable heavy duty strap anchors 20, as shown in FIG. 3, thereby providing an easy and secure connection. The inner protective shell 15 is also provided with a backrest 20, a seat portion 21 and side wall portions 22 whereby the shell offers protection to its occupant, usually a child, along the back, the seat and the sides so that when the inner shell is disconnected from the outer shell the infant and the shell are ejected together so that the shell will protect the infant in most cases upon landing as the child is rigidly strapped to the inner shell, as shown in FIG. 1.

The inner shell 15 is connected to the outer shell 12 by impact force detachable means which is herein constituted by a strap 23 which has at least VELCRO (hook-and-loop fastener) attaching portions 24 and 24' at opposed free ends of the VELCRO strap 23 on an inner side thereof. The VELCRO strap attaching portions 24 and 24' are herein constituted by hook connecting fibers 25, as is well known. The backrest portion 17 of the outer shell is provided with a reinforcing central vertical rib 26 and the strap 23 is held captive with the outer shell by a passage 27 disposed behind the vertical rib 26 in a top part of the backrest. The passage 27 is formed by opposed slots being made in the opposed side walls 26' of the central vertical rib 26. This rib also acts as an alignment means to receive the mating channel 28 which is formed with the inner shell 15. Accordingly, the inner shell is precisely aligned on the outer shell by these alignment means.

As the inner shell is positioned on the outer shell, the free end portions of the strap 23 are passed through respective slots 29 formed to each side of the channel projecting wall 28' whereby to engage a VELCRO patch 30 which is rigidly attached to the inner shell. The VELCRO patch 30 is formed with loop connecting fibers 31 whereby to be engaged by the hook connecting fibers 25 on the VELCRO attaching portions 24 of the strap 23.

The size of the VELCRO attaching portion 24 will determine the attachment force with the VELCRO patch 30 and therefore the force required to cause its detachment and to release the inner shell from the outer shell. This retention force has been determined from scientific analysis and experimentation, and they are provided to safely operate with an occupant having a weight falling in the range of from about 25 to about 100 pounds. However, because the surface area of the VELCRO attaching portions of the strap need to vary with different sizes of occupants, the strap width is changed to accommodate different sizes of occupants and the occupant sizes have been classified in four different weight groups as indicated by reference numeral 32 in FIG. 6. From experimentation, it has been determined that the width of the band can remain the same for groups 1 to 3, but the length of its attachment over the patch 30 varies depending on the weight of the occupant. For this purpose, the belt 23 may be provided with attachment portions of different sizes adjacent the opposed ends of the belt or else the belt could be provided of different lengths permitting only a predetermined free end portion to be secured to the VELCRO patch 30.

Figures 4, 5:
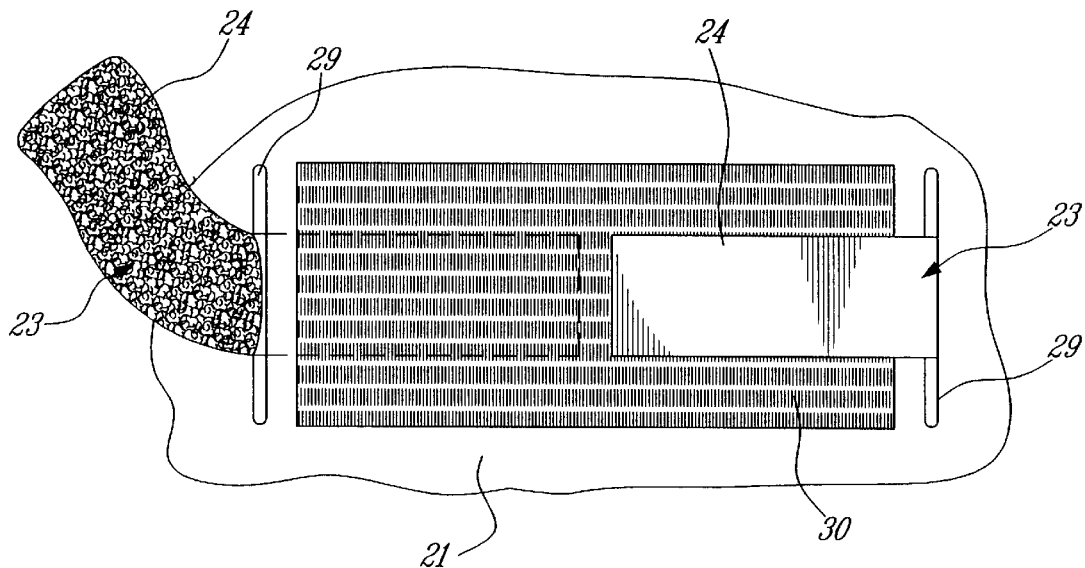

As shown in FIG. 5 for the fourth group of weights, the width of the band is double that of groups 1 to 3 and the surface area which is engaged with the patch is larger, thereby providing a larger retention force as indicated in the right-hand column.

The Table of FIG. 6 illustrates test results and it has been found that the effect of braking of the vehicle, herein a motorcycle, which was the vehicle used in these tests, does not provide a collision impact force and it has no effect on the VELCRO detachable connections. In order to overcome the retention force, it is essential that the occupant seated on the inner shell be subjected to an impact force whereby to transmit an abrupt force to the VELCRO connector to exceed its retention force to effectuate detachment of the inner protective shell and its occupant from the outer shell.

As shown in FIG. 4, the free end portions 24 and 24' of the strap 23 are disposed over the patch 30 in substantially equal proportions from each side thereof. The slots 29 are also narrow slots and they offer some frictional retention of the straps 24 when disconnected from the patch during ejection of the inner shell to absorb some of the impact force when the inner shell is in motion as the strap is in frictional engagement with the slots.

Referring again to FIG. 2, it can be seen that the central vertical rib 26 also extends in a horizontal portion 35 of the seat and likewise the channel 28 has a horizontal portion 36 which also extends on the seat portion 21. Further VELCRO connections between the inner shell and the outer shell may be provided by positioning VELCRO patches 37 and 37' on the vertical rib 26 and the horizontal rib 35 whereby to engage with complementary VELCRO patches 38 and 38' respectively, secured in the vertical channel 28 and horizontal channel 36 formed in the inner shell. However, these patches do not contribute significantly to the retention force but help in a smooth release of the inner shell. Also, the shape of the shells as well as the engaging ribs can help in guiding the direction of release of the inner shell.

With reference to FIG. 3, it can be seen that the safety seat structure of the present invention provides other features such as its adjustability to adapt to occupants of different physique. The inner shell 15, as hereinshown, is fitted with a detachable upholstered lining 40 which is fitted over an outer surface of the backrest portion 21 and side wall portions 22 of the inner shell. A detachable seat cushion 41 is also detachably secured to the seat portion 21' of the inner shell. The detachable seat cushion 41 constitutes a height adjustment means to adjust to the occupant size by providing cushions which are of different thickness. Adjustable footrests 42 are also detachably connected to the outer shell 12 to also suit the size of the occupant. The backrest portion 40' of the upholstered lining 40 is also provided with a flap 43 which extends over an opening therebehind to provide access to the VELCRO patch 30 rigidly secured to the backrest portion 21 of the inner shell. This patch 30 may be secured by an adhesive as is obvious to a person skilled in the art.

Figure 7:
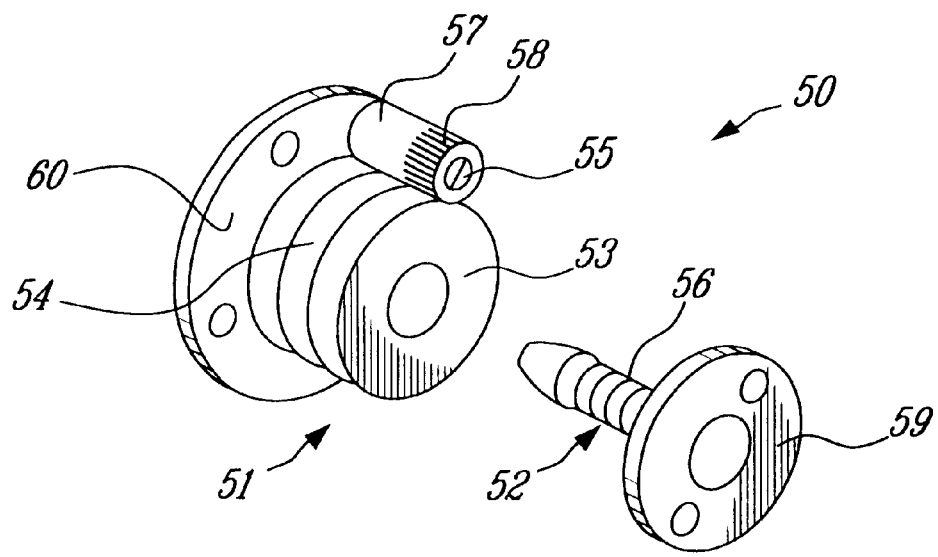
FIG. 7 is a perspective view showing a further realization of an impact force detachable means.

The present invention contemplates that the impact force detachable means, which in the preferred embodiment herein described is constituted by a VELCRO connection means, may also be provided by other force detachable means such as that illustrated in FIG. 7. As shown in FIG. 7, the impact force detachable means 50 may be constituted by a female connector 51 and a male connector 52. The female connector 51 may comprise a bushing 53 of compressible material and about which a compression band 54 is fitted. An adjustment screw 55 causes compression of the bushing when the attaching pin 56 of the male connector is inserted in the hole 61 therein. The screw casing 57 may be provided with grid lines 58 to indicate and adjust the compression force of the bushing whereby to set the desired adjustable retention force. The male connector 52 is provided with an attaching flange 59 and it, for example, could be secured to the outer surface of the backrest of the inner shell. Likewise, the female connector 51 is also provided with an attachment flange 60 and it could be conveniently located in cavities formed in the backrest portion of the outer shell. The inner and outer shells would be aligned by the mating of the male and female connectors. Various other impact force detachable means may be provided, as can be obvious to a person skilled in the art.

Figure 8:
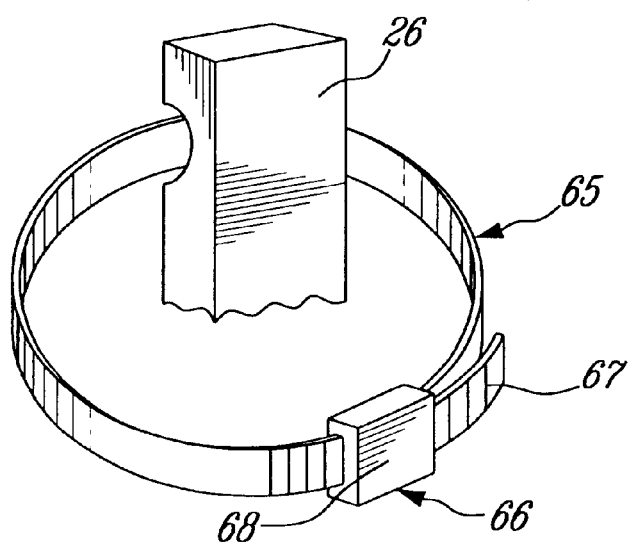
FIG. 8 is a perspective view of a tie-wrap type detachable means.

As shown in FIG. 8, the impact force detachable means may also be provided by a tie-wrap type strap 65 having a predetermined retention force as determined by the configuration of its connector assembly 66, as is well known in the art. Different straps 65 would be provided to suit the different groups of intended occupants. The strap 65 is constructed of suitable plastic material capable of performing under low and high ambient temperatures. When the predetermined retention force is exceeded, the engaged rib portion 67 of the strap will pull out of the connector housing 68. The strap 65 is engaged with the inner shell 15 through the holes 29.

It is within the ambit of the present invention to cover any obvious modifications of the preferred embodiment described herein, provided such modifications fall within the scope of the appended claims.

What is claimed is:

1. An ejectable safety seat structure comprising an outer rigid shell for securement to a vehicle, and an inner protective shell connected to said outer shell by impact force detachable means removably securable to said inner shell, a harness secured to said inner shell for detachably securing an occupant therein, said impact force detachable means automatically disconnects from said inner shell when said detachable means is subjected to a predetermined force upon impact of the vehicle.

2. An ejectable safety seat structure as claimed in claim 1 wherein said impact force detachable means is constituted by hook-and-loop fastening means.

3. An ejectable safety seat structure as claimed in claim 2 wherein said hook-and-loop fastening means is comprised of a strap having at least a hook-and-loop fastening portion, said strap being held captive by a strap connector secured to said outer shell, said attaching portion of said strap being detachably securable to a hook-and-loop fastening element secured to said outer shell and detachable therefrom.

4. An ejectable safety seat structure as claimed in claim 3 wherein said hook-and-loop fastening portion of said strap has a predetermined surface area which provides a predetermined retention force selected in relation to said predetermined force exerted on said strap by the load in said inner shell when said vehicle is subjected to said predetermined impact force which exceeds said retention force to effectuate detachment of said inner protective shell.

5. An ejectable safety seat structure as claimed in claim 4 wherein said hook-and-loop fastening portion is constituted by opposed free end hook-and-loop fastening portions of said strap, said hook-and-loop fastening element being a hook-and-loop fastening patch immovably secured in a central upper portion of a backrest of said inner shell, and a slot in said backrest on opposed sides of said patch for the passage of opposed end sections of said strap, said opposed free end hook-and-loop fastening portions being engageable with said patch in substantially equal proportions.

6. An ejectable safety seat structure as claimed in claim 5 wherein said outer shell is formed with a reinforcing central vertical rib extending in a backrest section thereof, said strap being held captive with said outer shell by a passage disposed behind said vertical rib and defined by two aligned slot passages, one disposed on each side of said rib, said inner shell having a vertical channel formed in a backrest section thereof for receiving said central vertical rib therein, said rib and channel constituting alignment means for said shells.

7. An ejectable safety seat structure as claimed in claim 5 wherein said slots on opposed sides of said patch are narrow slots selected to frictionally and slidingly engage said opposed end sections of said strap to provide shock absorption of said inner shell when said hook-and-loop fastening connection is detached.

8. An ejectable safety seat structure as claimed in claim 4 wherein said predetermined detachment force corresponds to a selected one or predetermined weight ranges of occupants, there being two or more groups of said weight ranges, said predetermined surface area being different with each weight range group.

9. An ejectable safety seat structure as claimed in claim 4 wherein said impact force detachable means further comprises hook-and-loop fastening connections secured to an inner surface of said outer shell and an inner surface of said inner shell and disposed at predetermined locations for mating connection when said inner shell is fitted within said outer shell.

10. An ejectable safety seat structure as claimed in claim 3 wherein said inner protective shell is constructed of shock absorbing material and contoured to provide side, back and seat sections to protect an occupant.

11. An ejectable safety seat structure as claimed in claim 10 wherein said inner shell is further provided with a detachable upholstered lining extending over an outer surface of said side and back sections, and a detachable seat cushion secured to said seat section.

12. An ejectable safety seat structure as claimed in claim 11 wherein said detachable seat cushion constitutes a height adjustment means by providing cushions of different thickness to suit its occupant.

13. An ejectable safety seat structure as claimed in claim 10 wherein said inner shell is further provided with adjustable footrests which are detachably securable to said inner shell to suit its occupant.

14. An ejectable safety seat structure as claimed in claim 1 wherein said impact force detachable means is provided by a female and male connector element secured respectively to said outer and inner shells and interengageable together by a predetermined clamping force which provides a predetermined retention force selected in relation to said predetermined impact force exerted on said connector elements by the load in said inner shell when subjected to said predetermined impact force and exceeding said retention force to effectuate attachment on said inner protective shell.

15. An ejectable safety seat structure as claimed in claim 1 wherein said impact force detachable means is a tie-wrap type strap having a connector assembly with a predetermined retention force and which releases upon receiving a load exceeding said retention force.

* * * * *